J. F. Holt,

Wringer Roll.

No. 3,930. Reissued Apr. 19. 1870.

Witnesses
A. Jones.
A. M. Smith

Woonsocket Rubber Co.
Assignee of the Inventor
John F. Holt,
By D. E. Somers & Co.
Its Attorneys

N. PETERS, PHOTO-LITHOGRAPHER, WASHINGTON, D. C.

United States Patent Office.

WOONSOCKET RUBBER COMPANY, OF WOONSOCKET, RHODE ISLAND, ASSIGNEES OF JOHN F. HOLT.

*Letters Patent No.* 49,030, *dated July* 25, 1865; *reissue No.* 3,930, *dated April* 19, 1870.

IMPROVED ROLLER FOR CLOTHES-WRINGERS.

The Schedule referred to in these Letters Patent and making part of the same

*To all whom it may concern:*

Be it known that JOHN F. HOLT, of Providence, in the county of Providence and State of Rhode Island, invented a new and useful Improvement in Rollers for Clothes-Wringers, and other similar purposes, and assigned the same to the Woonsocket Rubber Company, a corporation chartered by the State of Rhode Island, doing business at Woonsocket, in said county and State. The following is a full and exact description of the same, reference being had to the accompanying drawings making a part of this specification, in which—

Similar letters of reference indicate corresponding parts in both figures.

Figure 1:
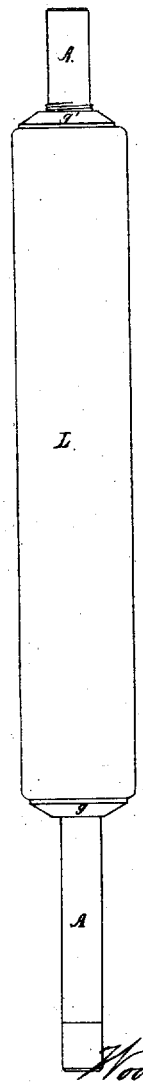
Figure 1 is a longitudinal view of my improved roll complete.
Figure 2:
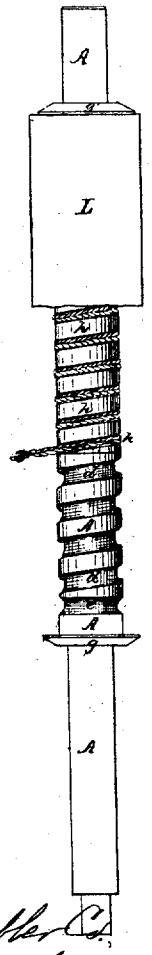
Figure 2 is a sectional view of the same, which exhibits the improved mode of construction.

This invention relates to a mode of securing a cylinder of India rubber, or a like suitable material, in a permanent and substantial manner, upon a mandrel or shaft, to form a useful and servicable roll for wringing or squeezing clothes in well-known machines for that purpose, and for other similar uses and purposes.

The great difficulty which has hitherto been experienced in the application of India rubber, gutta-percha, and like material, in the construction of rolls for the purpose mentioned, is that of preventing the exterior cylindrical body of India rubber, &c., from becoming detached from and slipping on the mandrel instead of turning with it, in which case the roll is rendered permanently inoperative and useless, and, although a great many ingenious contrivances have been employed to overcome this difficulty, none have succeeded in doing so without rendering the roll otherwise objectionable.

The invention for this purpose consists—

First, in constructing the mandrel or shaft with a spiral groove in the portion occupied by the elastic cylinder of India rubber or like material.

Second, in binding a preliminary sheet or thickness of the vulcanizable compound of India rubber or like material upon such mandrel by means of any suitable inelastic cord, braid, or thong, which is wound over said sheet or thickness of material in the spiral groove, in such a manner as to confine the material in unyielding spiral corrugations upon the mandrel, to prevent its slipping thereon, and to fill the spiral groove, so as to present an even cylindrical surface for the reception and confinement of the body of the material which constitutes the roll.

Third, in constructing the roll for the purpose specified, by combining the spiral grooved mandrel, the mode described of binding thereon a preliminary thickness of India-rubber compound or vulcanizable gum, and a suitable cylindrical body of the same material, and afterwards curing and thereby fusing the whole together on the mandrel by the process of vulcanizing, so called, as hereinafter specified.

To enable those skilled in the art to make and use his invention, we will proceed to describe the same.

In the drawings—

A is the mandrel, and

*d d* is the spiral groove, cut or otherwise formed therein, in the same manner as a screw-thread is formed, except that, for this purpose, the form of the groove is best made semicircular, and at the termination of the groove at each end there is made a semicircular score, *e*, directly around the mandrel, to receive the end of the binding-thong *f*.

There are, also, on the mandrel, two fixed collars, *g g*, near the circular score *e*, between which the elastic material of the roll is held and confined, to prevent any endwise or lateral movement of the same on the mandrel.

The mandrel may be of either wood or metal, and the spiral groove and scores may be cut therein in the usual way of cutting a screw-thread, or by casting the mandrel in such form, which being done, the elastic roll is formed thereon in the following manner, viz:

The grooved portion of the mandrel between the collars is wrapped with a suitable thickness, say, one sixteenth of an inch, of the soft compound of India rubber, or other vulcanizable gum, *h*, completely enveloping this portion of the mandrel.

A suitable binding-cord or thong, *n*, is then prepared, which may consist of a single cord, or three or more strands of cotton or other twine or cord, braided together, and this is saturated or coated with India-rubber cement, so called; or the binding-device may consist of a strip of metal, brass, copper, or iron, of a form and size that will, when wound upon the rubber in the groove, fit and completely fill the same.

The thong or binding device thus formed or prepared is wound in the spiral groove of the mandrel, from the score *e* at one end to the like score at the other end, upon the rubber compound or preliminary sheet, which is thus compressed into a spiral corrugated form, and bound tightly in the groove, forming, as it were, a female screw of India rubber corresponding with the male screw on the mandrel, and presenting, by a combination of the binding-braid or thong with a portion of the rubber compound which protrudes between the convolutions of the binding, an even and regular cylindrical surface, to and with which a subsequent thickness or body of the rubber compound or like material would adhere and unite, if properly applied, as well to the binding covered with the cement, as to the rubber compound itself.

After the preliminary thickness *h* of material is thus bound and secured on the mandrel, the surface thus formed is wrapped with the vulcanizable compound of India rubber, or like gum, by winding a sheet of the same thereon until a sufficient thickness or body is obtained to form the diameter of the roll L required.

The roll L is then subjected to the well-known process of vulcanizing India rubber, and like gums, which unites the body of the compound last put on solidly with that which is bound upon the mandrel, confining the whole securely and permanently thereto, and rendering the roll elastic and fit for use.

Instead of forming or constructing the roll L of India rubber permanently upon the mandrel, the rubber portion may be constructed in the same manner upon a temporary mandrel formed like that shown and described, except that the semicircular scores *e* are omitted, so that the India-rubber cylinder L, after being vulcanized, may be unscrewed from the temporary mandrel upon which it was formed or made up as decribed, and screwed on the mandrel to which it is to be permanently confined for use on the machine, in which case one only of the collars *g* is fixed on the mandrel, the other one *g'* being removable by means of a screw-thread cut therein and on the mandrel to admit of the screwing of the rubber cylinder thereon.

It will be seen that the mode described of binding a preliminary thickness of India-rubber compound on the mandrel, formed as described, forms a complete and perfect screw-thread within the rubber cylinder, which derives greater firmness from the inelastic binding device, and is, therefore, the more substantial and effective as a means of confining the cylinder on the mandrel than could be obtained by any process of molding in the rubber itself, although approximate results may be obtained by so molding the rubber in connection with a mandrel, substantially like that described.

What we claim as the invention of said JOHN F. HOLT, and desire to secure by Letters Patent, is—

1. The spiral grooved mandrel or shaft constructed substantially as described, for the purpose specified.

2. The binding of a preliminary sheet or thickness of vulcanizable material on the mandrel, substantially in the manner and for the purpose described.

3. A wringing-machine roller, constructed by first binding on a shaft, by means of a cord or wire, a covering of India rubber or other suitable material, and afterwards vulcanizing over and onto the latter an outer layer or coat of a vulcanizable substance or compound.

WOONSOCKET RUBBER COMPANY,
By LYMAN A. COOK, *President.*

Witnesses:
F. C. SOMES,
A. M. SMITH.